United States Patent [19]

Berry

[11] Patent Number: 4,586,154
[45] Date of Patent: Apr. 29, 1986

[54] DATA WORD NORMALIZATION

[75] Inventor: David N. Berry, Worthing, United Kingdom

[73] Assignee: The Singer Company, Binghamton, N.Y.

[21] Appl. No.: 449,058

[22] Filed: Dec. 13, 1982

[30] Foreign Application Priority Data

Feb. 2, 1982 [GB] United Kingdom ............... 8203927

[51] Int. Cl.⁴ ............................................. G06F 7/38
[52] U.S. Cl. ................................................. 364/748
[58] Field of Search ............. 364/748, 749, 715, 585, 364/722, 200 MS File, 900 MS File; 367/65-67; 340/347 DD

[56] References Cited

U.S. PATENT DOCUMENTS

| | | | |
|---|---|---|---|
| 3,193,669 | 7/1965 | Voltin | 364/748 |
| 3,725,649 | 4/1973 | Deerfield | 364/748 |
| 3,831,012 | 8/1974 | Tate et al. | 364/748 |
| 3,916,388 | 10/1975 | Shimp et al. | 364/749 |
| 4,078,250 | 3/1978 | Windsor et al. | 235/310 |
| 4,141,005 | 2/1979 | Bonner et al. | 340/347 DD |
| 4,208,722 | 6/1980 | Rasala et al. | 364/748 |
| 4,334,284 | 6/1982 | Wong | 364/748 |

FOREIGN PATENT DOCUMENTS 1519003 4/1978 United Kingdom ............... 364/736

OTHER PUBLICATIONS

Freiman et al., "Normalized Integer Operations for a Floating Point Arithmetic Unit", *IBM Technical Disclosure Bulletin*, vol. 9, No. 7, Dec. 1966, pp. 850-851.

Gooding et al., "Handling Leading Zeros in a Data Processing Unit", *IBM Technical Disclosure Bulletin*, vol. 17, No. 10, Mar. 1975, pp. 2844-2845.

"Am25S10 Four-Bit Shifter With Three-State Outputs" In: *Advanced Micro Devices Bipolar Microprocessor Logic and Interface Data Book*, Sunnyvale, Calif., Advanced Micro Devices, Inc., 1981, pp. 3-15 to 3-18.

Mick, J. R., "Am25S10 Four-Bit Shifter" In: *Advanced Micro Devices Bipolar Microprocessor Logic and Interface Data Book*, Sunnyvale, Calif., Advanced Micro Devices, Inc., 1981, pp. 3-19 to 3-28.

Primary Examiner—James D. Thomas
Assistant Examiner—Dale M. Shaw
Attorney, Agent, or Firm—Barry L. Haley; Stanton D. Weinstein

[57] ABSTRACT

A data word (bits ID0-ID15) is supplied to the address inputs of a memory arrangement U1, U2, U3 whose outputs S0-S3 supply to a parallel shifter SN a control word specifying the number of shifts required. As described, two read-only memories receive respective halves of the data word and feed a multiplexer U3 which selects the outputs of U1 unless the latter indicating that all its inputs are zero (or one, for negative numbers) in which case control is passed to U2. The sign bit (ID15) is supplied to both memories.

2 Claims, 2 Drawing Figures

DATA WORD NORMALIZATION

The present invention is concerned with data word normalisation, i.e. reduction of data to a standard form by shifting to remove leading zeroes (or, for a binary 2's complement negative number, leading ones).

An earlier method used for normalising a 16-bit two's complement data word entails the use of two 8-bit serial shift registers, an exclusive-NOR gate, and a clock signal, as illustrated in FIG. 1. To normalise a data word requires, for 2's complement signed numbers, the shifting up of data until the two most significant bits are equal to 01 or 10 (for positive and negative numbers respectively). The exclusive-NOR function detects this condition and holds the result. The disadvantages of this method are:

(i) to normalise a data word by n places takes n clock cycles, without taking into account the time taken to load and unload data.

(ii) if the data word were all zeroes then the circuit would not stop shifting.

(iii) the circuit must be provided with a clock signal to achieve the shift function.

(iv) a separate counter must be used to furnish information as to the number of shifts executed.

According to the present invention there is provided apparatus for data word normalisation comprising inputs for a multi-digit data word, memory means responsive to the inputs to produce a control output indicating the number of shifts required to normalise the word, and a parallel shifter responsive to the data word and the control output to provide a shifted output word.

In order to reduce the necessary memory capacity (which may conveniently be provided by read only memories (ROM's) or programmable read-only memories (PROM's)), first and second memories may be used whose address inputs are connected respectively to the most significant bits and least significant bits of the data word, selection between the control outputs of the memories being performed by a multiplexer which selects the output of the first memory unless the latter indicates that its inputs contain no significant data, whereupon the output of the second is selected. Thus if the first receives all zeroes (or, for a 2-s complement negative number, all ones) control is passed to the second memory to determine the number of shifts required. If signed numbers are being handled, the sign digit must be supplied to both memories.

Of course, this principle may be extended to more than two memories, with control being passed down from the most significant end.

The invention will find particular application with binary numbers, although it is in principle applicable to numbers of other bases.

One embodiment of the invention will now be described with reference to the accompanying drawings, in which.

Figure 1:
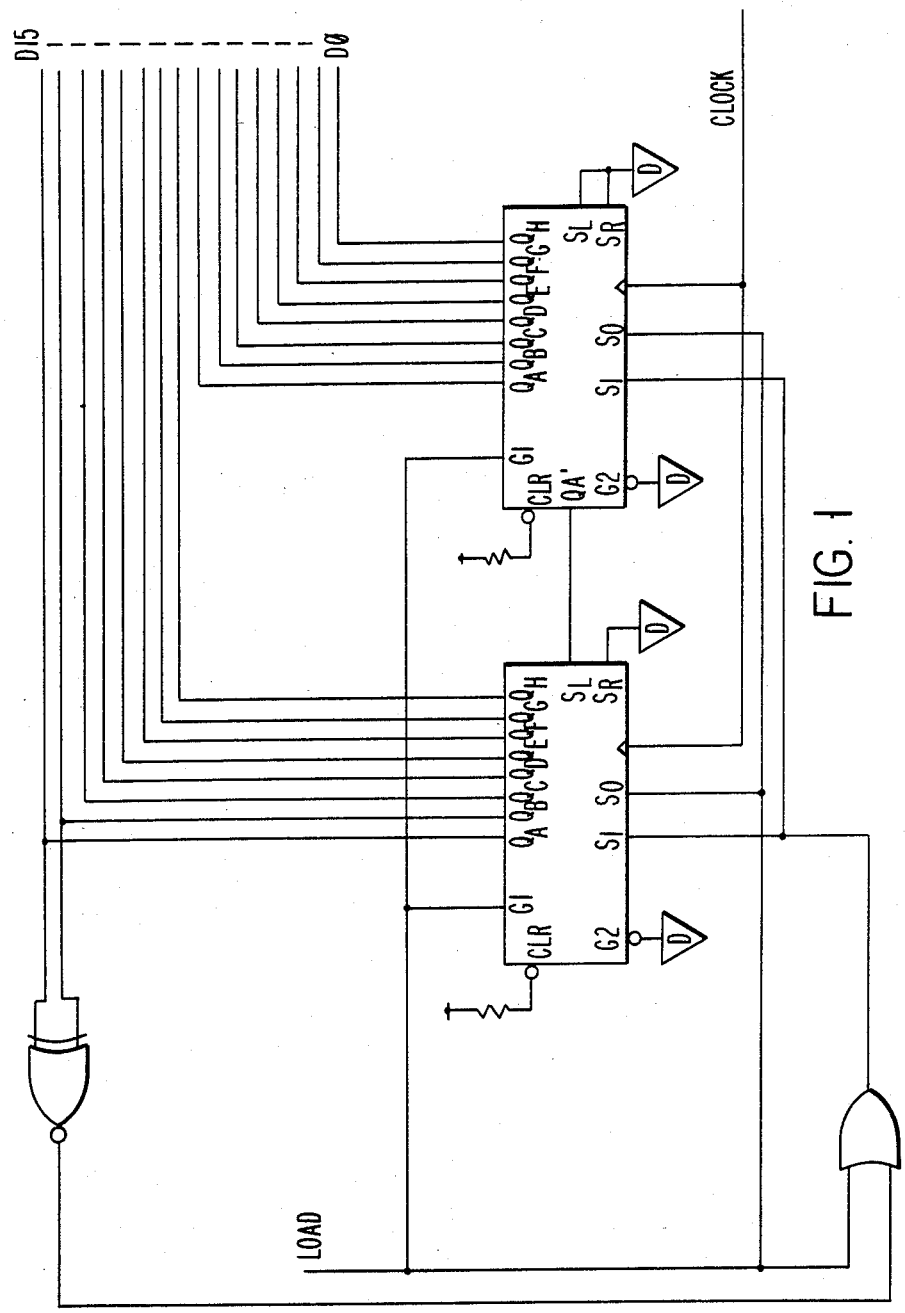
FIG. 1 is a block diagram of a known normalisation circuit.
Figure 2:
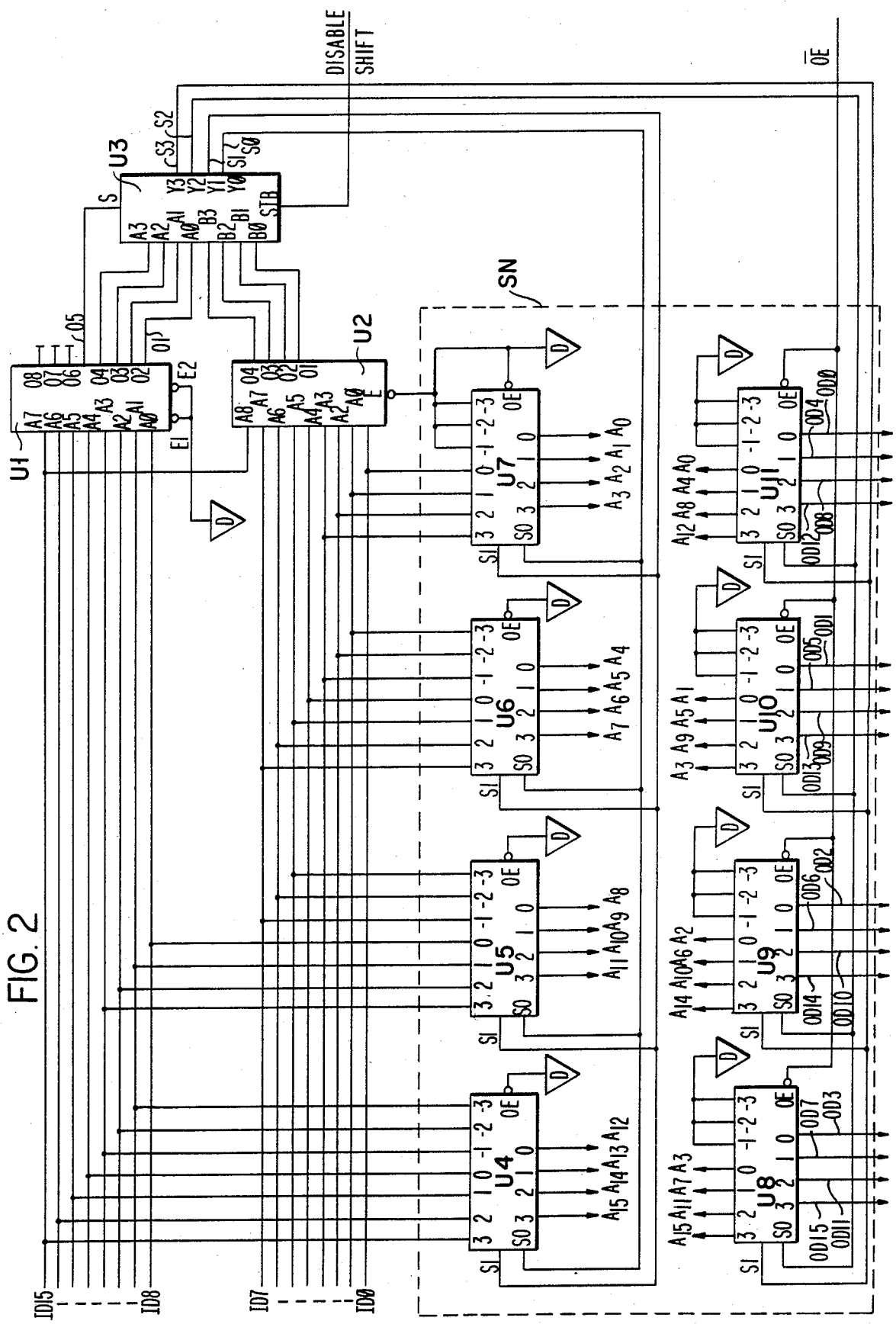
FIG. 2 is a block diagram of a normalisation circuit according to the invention.

The normalisation circuit shown in FIG. 2 has inputs ID$\emptyset$–ID15 for a 16-bit data word, which is assumed to be a signed, 2's complement number. The eight least significant bits ID$\emptyset$–ID7 are fed to the address inputs A$\emptyset$–A7 of a read-only memory U2 and bits ID8–ID14 to the address inputs of a second read-only memory U1. The sign bit, ID15 is fed to both memories (A8 of U2, A7 of U1).

U1 is a 256×8-bit programmable read-only memory (PROM), although only five bits of the output word are used. It may be type MMI6309-1J, which has a maximum access time of 70 ns. U2 is a 512×4-bit PROM, e.g. type MMI 6306-1J which has a maximum access time of 55 ns.

Outputs 01–04 of each PROM U1, U2 are connected to respective inputs of a quad 2:1 multiplexer U3 (e.g. type SN74S157N): the select input S of the multiplexer is fed from output 05 of U1. The PROM U1 analyses the top-eight data bits ID8–ID15 and decides whether more than 6 shifts are required, i.e. if the top eight bits are all zeroes (positive) or all ones (negative) then it is assumed that the relevant data is contained in the bottom eight bits. U1 then sets output $0_5$ to either 0 (for less than 7 shifts) or 1 (for more than 7 shifts), which controls the select input of the quad 2:1 multiplexer, U3, an SN74S157N; the outputs of which then follow the outputs $0_1$–$0_4$ of U1 or U2 respectively. For less than 7 shifts the outputs $0_4$–$0_1$ of U1 give a binary representation of the number of shifts required, e.g. 5=0101. For 7 shifts or more the outputs $0_4$–$0_1$ are 0 and the outputs of U2 are considered. Since the outputs of U2 are considered only when more than 6 shifts are required this PROM decides whether the data word is to be shifted by 0 or 7–14 places. Again the outputs $0_4$–$0_1$ are a binary representation of the number of shifts required. If the bottom eight bits are also all zeroes then the outputs are 0 indicating that no shifting is necessary.

The contents of the memories U1, U2 should be obvious from the above description: however, some examples are given in the following table (X="don't care"):

TABLE

| ID15-8 (Address to U1) | $0_5$ | $0_4$ | $0_3$ | $0_2$ | $0_1$ | |
|---|---|---|---|---|---|---|
| | | (U1 Data Out) | | | | |
| 00000000 | 1 | X | X | X | X | positive - all zero: control to U2 |
| 00000001 | 0 | 0 | 1 | 1 | 0 | positive: 6 shifts required |
| 0000001X | 0 | 0 | 1 | 0 | 1 | positive: 5 shifts required |
| 01XXXXXX | 0 | 0 | 0 | 0 | 0 | positive: no shifts required |
| 10000000 | 0 | 0 | 0 | 0 | 0 | negative: no shifts required |
| 1111110X | 0 | 0 | 1 | 0 | 1 | negative: 5 shifts required |
| 11111111 | 1 | 0 | 0 | 0 | 0 | negative - all ones: control to U2 |

The outputs S0–S3 of the multiplexer, U3, are applied to the shift status inputs of a parallel shift network SN, which consists of 8 AM25S10 4-bit parallel shifters, and is of conventional construction-see "Schottky and Low-Power Schottky Data Book", Advanced Micro Devices Inc., Second Edition, pp. 4.34 to 4.46. The data bits ID$\emptyset$–ID15 are applied to the data inputs of the shifter. The two least significant bits $S_0$ and $S_1$ are applied to the first stage of the network consisting of four 4-bit shifters U4–U7 in cascade and the two most significant bits $S_2$ and $S_3$ to the second stage U8–U11. The net result is an n-bit shift of between 0 and 14 places. The outputs of the multiplexer can be forced low by setting the STB input high, thereby disabling the shift function. The outputs of the AM25S10 have a tri-state control which allows the circuit to be used in bus orientated systems, but this would require the input data bus to be latched.

Some advantages of the apparatus described are:

(i) since the circuit is totally asynchronous no clock signal must be provided.

(ii) a data word can be normalised in one step in <150 ns.

(iii) data words of all zeroes are not shifted.

(iv) separate pins for input and output ease loading and unloading requirements.

(v) information as to the number of places shifted is directly available.

The apparatus can be used on bus oriented systems such as microprocessor applications. A data latch would have to be provided if the input and output data lines were common so as to keep the input data to the PROM's stable. The output can be read by setting the $\overline{\text{OE}}$ line of the shift network LOW. A register or tri-state buffer could be provided to facilitate the reading of the shift status signals S3–S0.

I claim:

1. An apparatus for data word normalisation for reduction of data to a standard form by shifting comprising:

means for providing inputs for a multi-digit data word;

memory means connected to said input means and responsive to the inputs in said input means to produce a control output for asynchronously controlling the number of shifts required to normalize the word;

a parallel shifter connected to said memory means responsive to the data word and the control output to provide a shifter output word;

a first memory responsive to a first, most significant, portion to the input word;

a second memory responsive to the least significant portion of said input word;

a multiplexer connected to said first and said second memories and controlled by the first memory and second memory to select the control output of that memory connected to the most significant group of inputs containing significant data; and means for normalizing signed numbers, the signed digit of the data word being supplied to each memory.

2. An apparatus as in claim 1 wherein:

said first and second memories are read only memories.

* * * * *